No. 868,936. PATENTED OCT. 22, 1907.
P. J. McGINN.
TESTING FITTING AND CLEAN-OUT.
APPLICATION FILED JUNE 2, 1906.

WITNESSES

INVENTOR
Patrick J. McGinn

UNITED STATES PATENT OFFICE.

PATRICK J. McGINN, OF NEW YORK, N. Y.

TESTING-FITTING AND CLEAN-OUT.

No. 868,936.      Specification of Letters Patent.      Patented Oct. 22, 1907.

Application filed June 2, 1906. Serial No. 319,883.

*To all whom it may concern:*

Be it known that I, PATRICK J. McGINN, a citizen of the United States, residing at New York, in the county of New York and State of New York, have invented certain new and useful Improvements in a Testing-Fitting and Clean-Out, of which the following is a specification.

This invention has relation to combined pipe cleanout and testing fitting and it consists in the novel construction and arrangement of its parts as hereinafter shown and described.

The object of the invention is to provide a fitting adapted to be so constructed as to be applied to a system of screw pipe or to cast iron pipe, and which is so constructed that it may be manipulated to serve as a testing means for the pipe system, and also it is capable of manipulation to serve as a cleanout for the system of piping. When not used in either capacity, the fitting remains in place upon the system and does not in any way interfere with the function of the pipe system and at the same time the fitting is maintained as a permanent attachment to the piping and can be readily used in either of its said capacities when occasion arises requiring such use.

Figure 1:
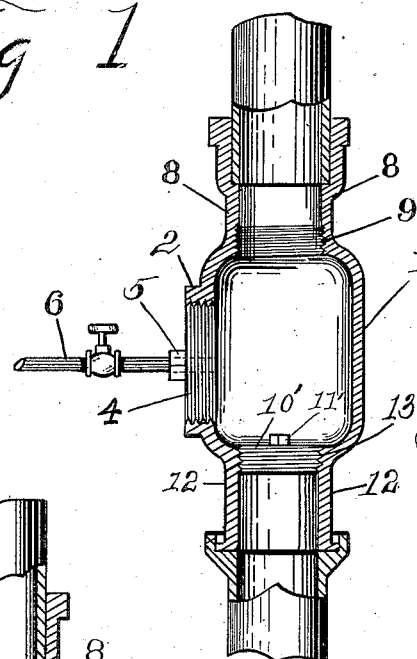
Figure 2:
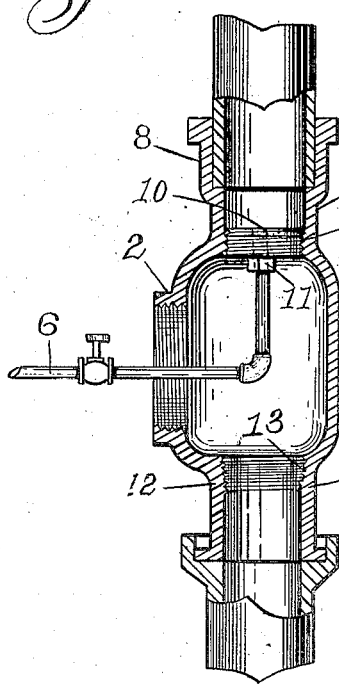
Figure 3:
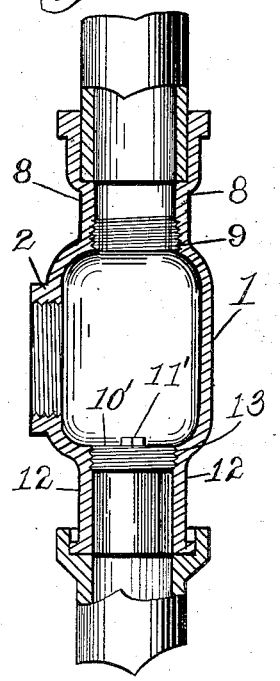
Figure 4:
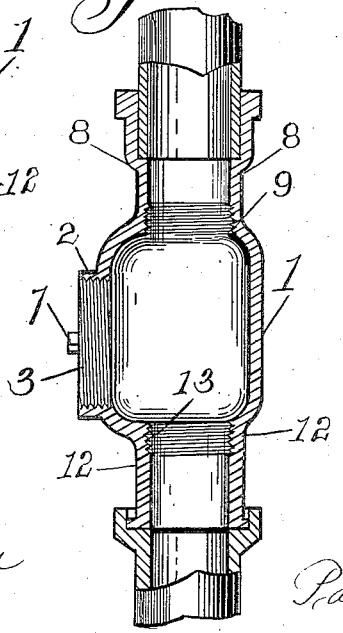

In the accompanying drawing:—Figure 1, is a vertical sectional view of the fitting illustrating one method of using the same in pipe testing. Fig. 2, is a vertical sectional view of the fitting illustrating another method of using the same in pipe testing. Fig. 3, is a vertical sectional view of the fitting illustrating its use as a pipe cleanout. Fig. 4, is a vertical sectional view of the fitting applied to the piping and being closed.

The fitting consists of the intermediate barrel 1, which is provided with the lateral port 2. The said port 2, is internally screw threaded and is adapted to receive the plug 3, as shown in Fig. 4, or the bushing 4, as shown in Fig. 1. The bushing 4, is provided with the squared boss 5, which is adapted to receive the end of the pipe 6. The plug 3, is provided with the squared wrench tap 7. The nipple 8, is located at the upper end of the barrel portion 1, and is provided just above its juncture with the said barrel with the internal thread 9. Said thread is adapted to receive the bushing 10. (See Fig. 2.) The said bushing 10 is provided with the squared boss 11, which is adapted to receive the end of the pipe 6. The nipple 12, is in vertical alinement with the nipple 8 and extends from the lower end of the barrel portion 1. The said nipple 12 is provided with the internal thread 13 at the point where it enters the said barrel portion 1. Said thread 13, is adapted to receive the plug 10' which is provided with a boss 11'. The diameter of the nipples 8 and 12 is less than the diameter of the port 2.

When used for testing pipe whether screw or cast the parts may be arranged as shown in either Fig. 1, or Fig. 2. When used as a clean out the parts are arranged as shown in Fig. 3, and when not in use in either capacity the parts are arranged as shown in Fig. 4.

Having described my invention what I claim as new and desire to secure by Letters Patent is:—

1. A device of the character as described, consisting of an intermediate barrel portion, nipples located at the upper and lower ends of said barrel portion, means for closing either of said nipples, said barrel portion having a port, a means for closing said port, and a pipe adapted to be applied to the port closing means and a pipe adapted to be applied to the closing means of the upper nipple.

2. A device of the character as described, consisting of an intermediate barrel portion, nipples located at the upper and lower ends of said barrel portion and each being provided with an internal screw thread, a plug and a bushing adapted to engage said threads, said barrel portion having a lateral port which is internally threaded, a plug and a bushing adapted to engage the port thread, said bushings adapted to receive the end of a water supply pipe.

In testimony whereof I have signed my name to this specification in the presence of two subscribing witnesses.

PATRICK J. McGINN.

Witnesses:
   WILLIAM J. FEARNS,
   NETTIE A. BERNHARD,